United States Patent
Grochowski et al.

(10) Patent No.: US 9,367,314 B2
(45) Date of Patent: Jun. 14, 2016

(54) CONVERTING CONDITIONAL SHORT FORWARD BRANCHES TO COMPUTATIONALLY EQUIVALENT PREDICATED INSTRUCTIONS

(71) Applicant: Intel Corporation, Santa Clara, CA (US)

(72) Inventors: Edward Thomas Grochowski, San Jose, CA (US); Martin Guy Dixon, Portland, OR (US); Yazmin A. Santiago, Beaverton, OR (US); Mishali Naik, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 410 days.

(21) Appl. No.: 13/838,450

(22) Filed: Mar. 15, 2013

(65) Prior Publication Data

US 2014/0281387 A1    Sep. 18, 2014

(51) Int. Cl.
  G06F 9/30    (2006.01)
  G06F 9/38    (2006.01)
(52) U.S. Cl.
  CPC ........ *G06F 9/30058* (2013.01); *G06F 9/30072* (2013.01)
(58) Field of Classification Search
  None
  See application file for complete search history.

(56) References Cited

U.S. PATENT DOCUMENTS

| | | | |
|---|---|---|---|
| 5,799,180 A | 8/1998 | Shiell et al. | |
| 6,430,682 B1 | 8/2002 | Dwyer, III | |
| 6,662,294 B1 | 12/2003 | Kahle et al. | |
| 6,754,812 B1 | 6/2004 | Abdallah et al. | |
| 6,918,032 B1 | 7/2005 | Abdallah et al. | |
| 8,181,168 B1 | 5/2012 | Lee et al. | |
| 2004/0064683 A1 | 4/2004 | Kalluri et al. | |
| 2010/0262813 A1* | 10/2010 | Brown et al. | 712/240 |

FOREIGN PATENT DOCUMENTS

| | | | |
|---|---|---|---|
| JP | 10-124315 A | 5/1998 | |
| JP | 2001-175473 A | 6/2001 | |
| JP | 2002-149401 A | 5/2002 | |
| JP | 2013-175201 A | 9/2013 | |

OTHER PUBLICATIONS

Office Action received for Japanese Patent Application No. 2014-047202, mailed on Feb. 3, 2015, 7 pages of English Translation and 1 pages of Japanese Office Action.

(Continued)

*Primary Examiner* — Scott Sun
(74) *Attorney, Agent, or Firm* — Vecchia Patent Agent, LLC

(57) ABSTRACT

A processor is operable to process conditional branches. The processor includes instruction fetch logic to fetch a conditional short forward branch. The conditional short forward branch is to include a conditional branch instruction and a set of one or more instructions that are to sequentially follow the conditional branch instruction in program order. The set of the one or more instructions are between the conditional branch instruction and a forward branch target instruction that is to be indicated by the conditional branch instruction. The processor also includes instruction conversion logic coupled with the instruction fetch logic. The instruction conversion logic is to convert the conditional short forward branch to a computationally equivalent set of one or more predicated instructions. Other processors are also disclosed, as are various methods and systems.

24 Claims, 15 Drawing Sheets

(56) References Cited

OTHER PUBLICATIONS

Combined Search and Examination report received for United Kingdom Patent Application No. 1404723.7, mailed on Oct. 9, 2014, 8 pages.

Office Action received for Japanese Patent Application No. 2014-047202, mailed on Sep. 8, 2015, 6 pages of English Translation and 9 pages of Japanese Office Action.

Office Action received for Korean Patent Application No. 10-2014-0030645, mailed on May 29, 2015, 5 pages of English Translation and 5 pages of Korean Office Action.

Office Action received for United Kingdom Patent Application No. 1404723.7, mailed on Jun. 26, 2015, 3 pages.

Office Action received for Korean Patent Application No. 10-2014-0030645, mailed on Jan. 29, 2016, 11 pages of English Translation and 10 pages of Korean Office Action.

* cited by examiner

FIG. 3

METHOD OF PROCESSING
CONDITIONAL BRANCHES
320

FETCH CONDITIONAL SHORT FORWARD BRANCH INCLUDING CONDITIONAL BRANCH INSTRUCTION AND SET OF ONE OR MORE INSTRUCTIONS SEQUENTIALLY FOLLOWING CONDITIONAL BRANCH INSTRUCTION IN PROGRAM ORDER BETWEEN CONDITIONAL BRANCH INSTRUCTION AND FORWARD BRANCH TARGET INSTRUCTION INDICATED BY CONDITIONAL BRANCH INSTRUCTION — 321

CONVERT CONDITIONAL SHORT FORWARD BRANCH TO COMPUTATIONALLY EQUIVALENT SET OF ONE OR MORE PREDICATED INSTRUCTIONS — 322

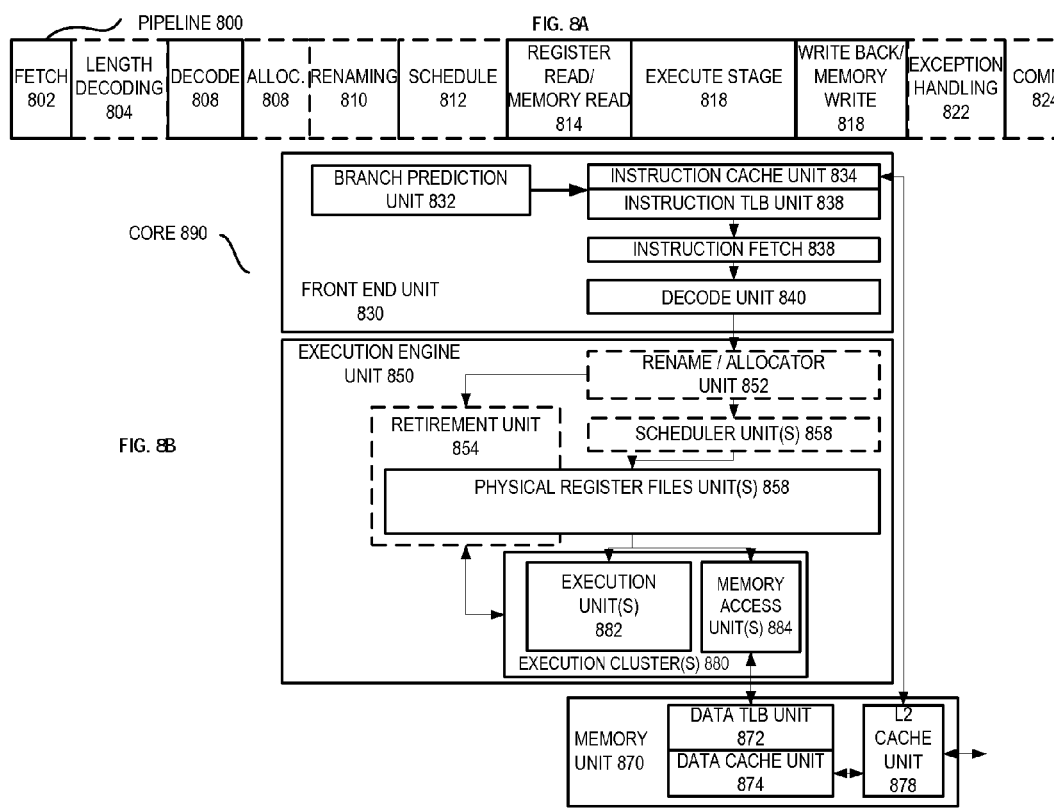

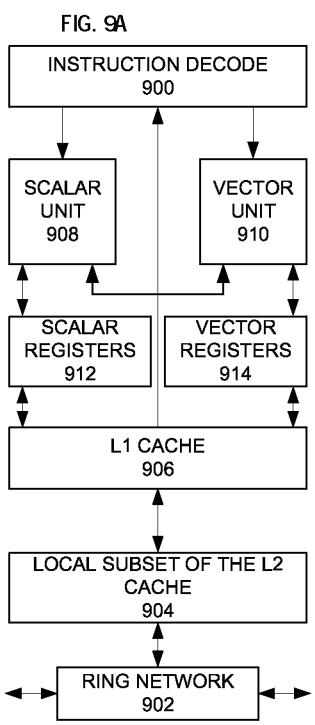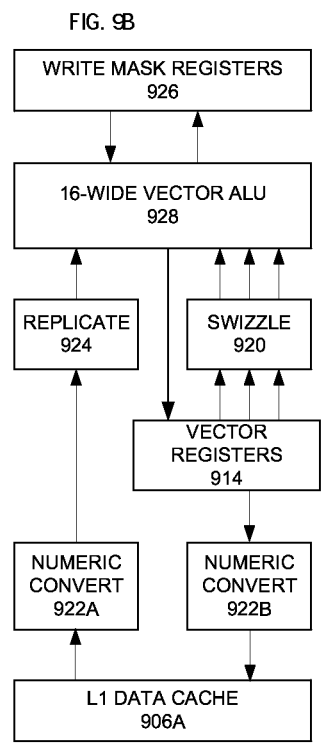

CONVERTING CONDITIONAL SHORT FORWARD BRANCHES TO COMPUTATIONALLY EQUIVALENT PREDICATED INSTRUCTIONS

BACKGROUND

1. Technical Field

Embodiments described herein generally relate to processors. In particular, embodiments described herein generally relate to the handling of conditional branches in processors.

2. Background Information

Certain processors use pipelined execution to overlap execution phases. This may allow multiple instructions to be in different phases of execution at the same time, which may help to improve performance. The amount of parallelism achieved tends to increase as the pipeline depth increases. Over time, certain processors have incorporated ever deeper pipelines in an attempt to improve performance. These deep pipelines tend to be more effective when the instruction stream is known so that the pipeline can be kept full and the execution of subsequent instructions do not need to wait on the results of the previous instructions in the pipeline.

One challenge is that programs or code executed by processors typically contain conditional branches. Examples of such conditional branches include "jump if condition is or is not met" type of instructions, and other conditional control flow changing instructions known in the arts. The conditional branches may cause the flow of execution to branch conditionally in one of two possible directions. These two directions are often called a "taken path" and a "not taken path". The "not taken path" commonly leads to the next sequential instruction in the code being executed, whereas the "taken path" commonly jumps, moves, or branches over one or more intervening instructions to a non-sequential target instruction. Whether the branches are taken or not taken generally depends upon the evaluation of conditions associated with the instructions (e.g., whether or not the conditions are met).

To help improve performance, most modern processors have branch predictors to help predict the directions of the conditional branches before the actual directions of the conditional branches have been determined. Generally, the actual directions of the conditional branches are not known definitively until the condition has actually been evaluated at a subsequent stage of the pipeline. However, the branch predictors may employ a branch prediction mechanism or logic to predict the directions of the conditional branches (e.g., based on past history). This may help to improve processor performance. Without the branch predictors, the processor might have to wait for the evaluation of the conditions associated with the conditional branch instructions before it could fetch additional instructions into the pipeline. However, the branch predictor may help to avoid such wasted time by predicting the most likely direction of the conditional branch. The predicted branch direction may then be used to fetch additional instructions and execute them speculatively.

Ultimately the predicted branch direction will turn out either to be correct or incorrect. If the predicted branch direction turns out to be correct, then the results and/or state of the speculatively executed instructions may be utilized. In this case, the performance and speed of the processor will generally have been increased due to greater utilization of pipeline stages that would otherwise have been dormant, or at least underutilized, while waiting for the evaluation of the actual direction of the conditional branch. However, if instead the predicted branch direction turns out to be incorrect (e.g., was miss-predicted by the branch predictor), then any results and/or state from the instructions speculatively executed beyond the conditional branch instruction will typically need to be discarded. Often, the pipeline will be flushed (discarding instructions currently in flight in the pipeline) and the execution will be rewound back to the conditional branch that was miss-predicted and restarted with the alternate now correctly known branch direction. This outcome is generally undesirable, since it tends to incur both a performance penalty and an energy penalty.

BRIEF DESCRIPTION OF THE DRAWINGS

The invention may best be understood by referring to the following description and accompanying drawings that are used to illustrate embodiments of the invention. In the drawings:

FIG. 3 is a block flow diagram of an embodiment of a method of processing conditional branches.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIG. 9A is a block diagram of a single processor core, along with its connection to the on-die interconnect network and with its local subset of the Level 2 (L2) cache, according to embodiments of the invention.

FIG. 9B is an expanded view of part of the processor core in FIG. 9A according to embodiments of the invention.

DETAILED DESCRIPTION OF EMBODIMENTS

Disclosed herein are processors, methods, and systems to convert conditional short forward branches to computationally equivalent sets of one or more predicated and/or conditionally executed instructions. In the following description, numerous specific details are set forth (e.g., specific types of conditional branch instructions, specific conditional short forward branches, logic implementations, processor configurations, microarchitectural details, sequences of operations, logic partitioning/integration details, types and interrelationships of system components, etc.). However, it is understood that embodiments of the invention may be practiced without these specific details. In other instances, well-known circuits, structures and techniques have not been shown in detail in order not to obscure the understanding of this description.

Figure 1:
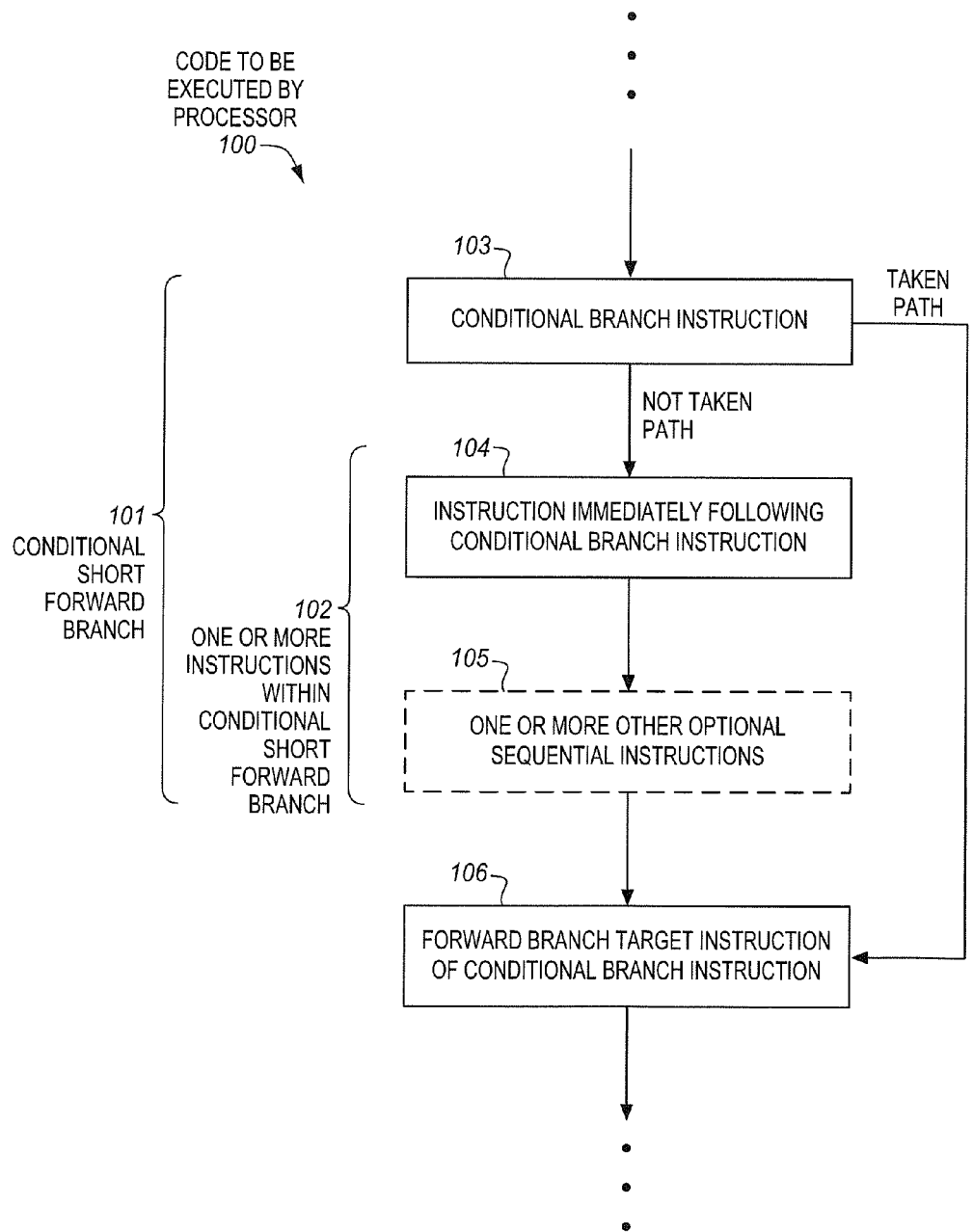
FIG. 1 is a block flow diagram of a portion of a program or code that includes a conditional short forward branch.

FIG. 1 is a block flow diagram of a portion of a program or code 100 to be executed by a processor, which includes a conditional short forward branch 101. A conditional branch instruction 103 is located at the beginning of the conditional short forward branch. The conditional branch instruction has a "taken path" and a "not taken path". The taken path leads to a forward branch target instruction 106 indicated by the conditional branch instruction. For example, the conditional branch instruction may have an argument or source operand to indicate the forward branch target instruction (e.g., specify an offset from the conditional branch instruction to the branch target instruction).

In various embodiments, the conditional branch instruction may represent a conditional jump instruction, a conditional control flow transfer instruction, or other types of conditional branch instructions known in the arts. Intel Architecture includes a number of suitable examples of conditional jump instructions. A few representative examples of suitable "jump if condition is met" (jcc) instructions include, but are not limited to: (a) a jump short if above (carry flag=0 and zero flag=0) instruction (JA); (b) a jump short if carry (carry flag=1) instruction (JC); (c) a jump near if 0 (zero flag=1) instruction (JZ); (d) a jump short if not zero (zero flag=0) instruction (JNZ); (e) a jump near if below or equal (carry flag=1 or zero flag=1) instruction (JBE); and (f) a jump near if not greater (zero flag=1 or sign flag≠OF) instruction (JNG). Intel® Itanium® Architecture also includes suitable branch instructions. For example, the br (branch) instruction has a cond (conditional) type in which the branch instruction uses a qualifying predicate to determine whether not to take the branch. If the predicate is 1 then the branch is taken, otherwise the branch is not taken. Some RISC architectures also include a number of suitable examples of conditional branch instructions. A few representative examples of such conditional branch instructions include, but are not limited to: (a) a branch if equal instruction (BEQ); (b) a branch if not equal instruction (BNE); (c) a branch if carry clear instruction (BCC); (d) a branch if carry set instruction (BCS); (e) a branch if signed greater than instruction (BGT); and (f) a branch if no overflow instruction (BVC).

The "not taken path" leads to a set of one or more instructions 102 that sequentially follow the conditional branch instruction in program order and are between the conditional branch instruction and the forward branch target instruction indicated by the conditional branch instruction. In the illustrated embodiment, these include at least an instruction 104 that immediately follows the conditional branch instruction in program order. Optionally, in some embodiments, the conditional short forward branch 101 may also include one or more other optional sequential instructions 105 in program order between the conditional branch instruction and the forward branch target instruction. In some embodiments, the conditional short forward branch may include from one to about five, or from one to about three instructions, which are between the conditional branch instruction and the forward branch target instruction, although the scope of the invention is not so limited. In other embodiments, provided that a sufficient variety of conditional/predicated instructions are available in the given architecture (e.g., as in the Itanium architecture), larger conditional forward branches may also be used.

Figure 2:
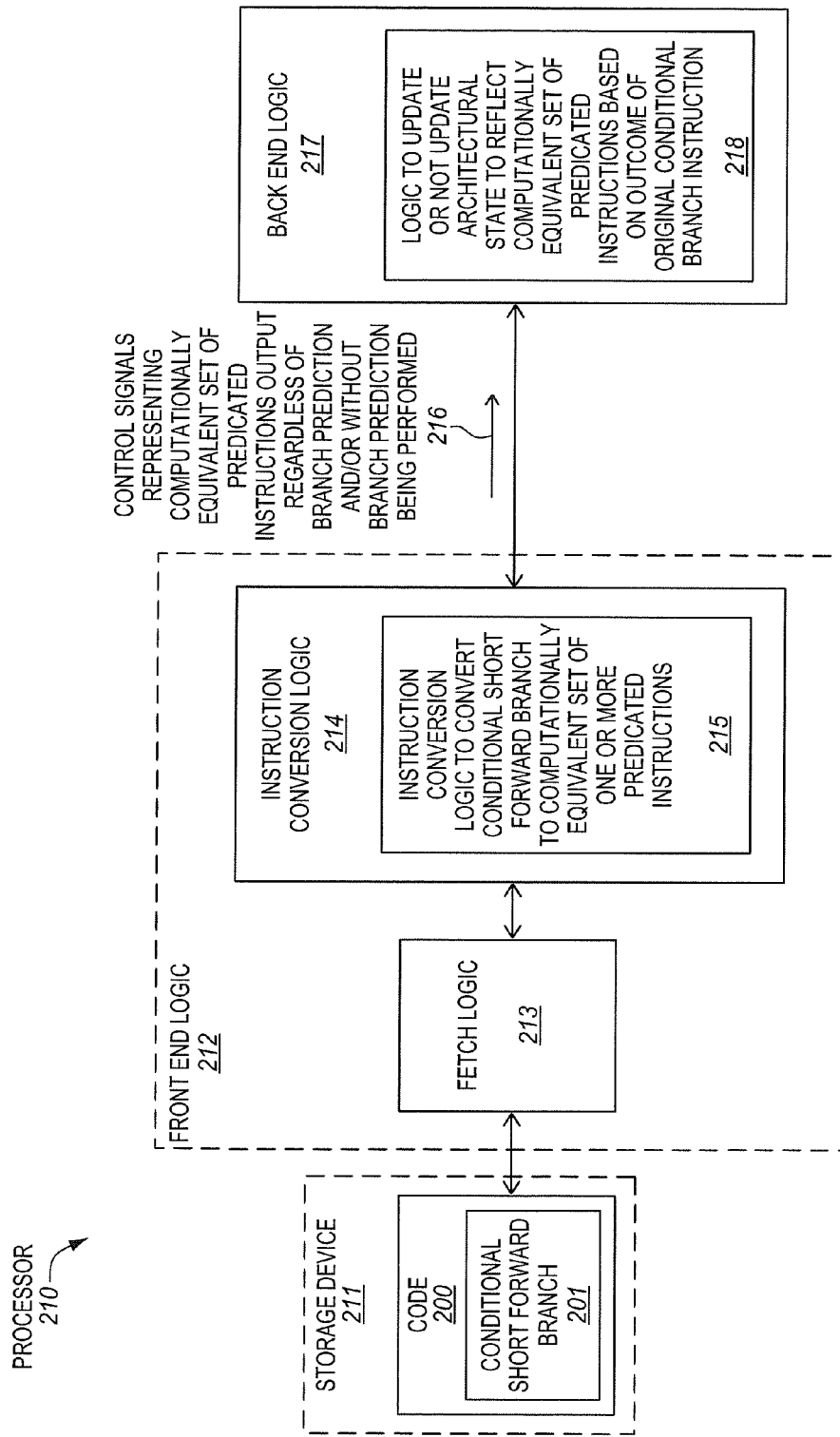
FIG. 2 is a block diagram of an embodiment of a processor that is operable to process conditional branches.

FIG. 2 is a block diagram of an embodiment of a processor 210 that is operable to process conditional branches. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples. The processor may be any of various complex instruction set computing (CISC) processors, various reduced instruction set computing (RISC) processors, various very long instruction word (VLIW) processors, various hybrids thereof, or other types of processors entirely.

The processor has front end logic 212. The front end logic includes instruction fetch logic 213. The instruction fetch logic is operable to fetch instructions of code 200, including instructions of a conditional short forward branch 201, from a storage device 211. In various embodiments, the storage device may include a cache (e.g., an instruction cache, and instruction and data cache, etc.) or a memory to which the processor may be coupled when deployed in a system. In some embodiments, the conditional short forward branch may include a conditional branch instruction, and a set of one or more instructions that sequentially follow the conditional branch instruction in program order, and are between the conditional branch instruction and a forward branch target instruction indicated by the conditional branch instruction.

In some embodiments, the conditional short forward branch may be similar to or the same as the conditional short forward branch of FIG. 1. Alternatively, the conditional short forward branch may be different than that of FIG. 1. The fetched instructions may represent machine code instructions, assembly language instructions, macroinstructions, or other relatively higher level instructions or control signals that are provided to the processor for execution. These instructions may be part of an instruction set architecture (ISA) of the processor. The ISA represents a part of the architecture of the processor related to programming and commonly includes the native instructions, architectural registers, data types, addressing modes, and the like, of the processor.

Referring again to FIG. 2, instruction conversion logic 214 is coupled with the instruction fetch logic 213. In some embodiments, the instruction conversion logic may include instruction decode logic and/or logic at a decode stage of a pipeline of the processor. The instruction decode logic may also be referred to herein as decode logic, a decode unit, or a decoder. The instruction conversion logic may be implemented using various different mechanisms including hardware (e.g., integrated circuits, transistors, etc.), firmware (e.g., instructions stored in non-volatile memory), software, or a combination thereof. In some embodiments, the instruction conversion logic includes at least some on-die hardware logic potentially combined with some firmware and/or software. Examples of suitable mechanisms for implementing the instruction conversion logic include, but are not limited to, microcode read only memories (ROMs), look-up tables, hardware implementations, programmable logic arrays (PLAs), and other instruction decoding and conversion mechanisms known in the art.

The instruction conversion logic may receive the fetched machine instructions, macroinstructions, or other relatively higher level instructions or control signals from the instruction fetch unit. The instruction conversion logic may be operable to convert the received instructions or control signals into corresponding relatively lower-level microinstructions, micro-operations, micro-ops, micro-code entry points, or other lower-level instructions or control signals. Examples of suitable conversions include, but are not limited to, decoding, emulating, morphing, translating, otherwise converting, or a combination thereof. The relatively lower-level instructions or control signals may implement the operations of the relatively higher-level instructions or control signals through lower-level (e.g., circuit-level or hardware-level) operations. In one aspect, the relatively lower-level instructions or control signals may be executable or implementable on native processor hardware (e.g., execution units, circuits, etc.).

Referring again to FIG. 2, in some embodiments, the instructions of the conditional short forward branch 201 may also be provided to the instruction conversion logic 214. The instruction conversion logic includes instruction conversion logic 215 that is operable to convert the instructions of the conditional short forward branch to a computationally and/or functionally equivalent set of one or more predicated instructions. In some embodiments, the predicated instructions may be computationally and/or functionally equivalent to the original instructions in that they may perform the same or equivalent operations (e.g., arithmetic, logical, etc.) as the original instructions, and in that they may operate on the same or equivalent operands (e.g., architectural registers, memory locations, etc.) as the original instructions. In some embodiments, each instruction in the conditional short forward branch after the conditional branch instruction may be converted from a non-predicated instruction to a corresponding functionally equivalent predicated instruction.

In some embodiments, the instruction conversion logic 215 may eliminate the conditional branch instruction as part of the conversion. In some embodiments, the conditional aspect of the conditional branch macroinstruction may, at least conceptually, be combined with each of one or more macroinstructions within the conditional short forward branch (e.g., between the conditional branch instruction and a target of the conditional branch instruction). In some embodiments, a conversion may be performed in which the conditional branch instruction is eliminated (i.e., the branch aspect) and the conditional aspect is incorporated into the decoded versions (e.g., the microinstructions) of each of the other instructions within the conditional short forward branch.

As shown, in some embodiments, instructions (e.g., microinstructions) or other control signals 216 corresponding to and/or representing the functionally and/or computationally equivalent set of predicated instructions may be output from the instruction conversion logic to back end logic 217 regardless of whether a branch predictor predicts the conditional branch instruction to be "taken" or "not taken," and/or without the branch predictor even needing to make the branch prediction, and/or without the instruction conversion logic needing to know the branch prediction. That is, control signals representing the instructions within the conditional short forward branch, which ordinarily would not be inserted into the pipeline if the branch was predicated to be taken, may now be inserted into the pipeline irrespective of branch prediction and/or without even needing to perform such branch prediction. This may help needing to avoid flushing the pipeline and/or rewinding execution as would normally be needed in the event of a branch miss-prediction. In some embodiments, it is hardware or other logic of a processor that performs the conversion, rather than a software compiler.

Referring again to FIG. 2, the back end logic 217 includes logic 218 to update, or not update, architectural state to reflect the functionally and/or computationally equivalent set of one or more predicated instructions based on an ultimately resolved outcome of a condition associated with the original conditional branch instruction of the conditional short forward branch. In some embodiments, if the outcome of the condition of the conditional branch instruction is ultimately resolved that the conditional branch should have been taken, then the logic 218 may not update the architectural state to reflect the functionally and/or computationally equivalent set of predicated instructions. Conversely, if the outcome of the condition of the conditional branch instruction is ultimately resolved that the conditional branch should have been not taken, then the logic 218 may update the architectural state to reflect the functionally and/or computationally equivalent set of predicated instructions. In some embodiments, the logic may utilize select logic to either select the result of the predicated instructions or a prior result ignoring the predicated instructions and/or operating as if they were not executed.

Advantageously, such conversion of the conditional short forward branch instructions to predicated instructions, and such use of the predicated instructions to either update or not update architectural state, may help to improve the speed and energy conservation of the processor by avoiding the speed and energy penalties of miss-predicated conditional branches. The instructions following the conditional branch instruction within the short forward loop are fed into the pipeline but processed with predication until it is determined whether or not definitively the conditional branch should have been taken or not taken. No rewinding of the execution of the processor in the event of a branch miss-prediction and the associated discarding of speculatively executed state is needed. Such advantages may tend to be especially significant in certain large out-of-order processors with increasingly deep pipelines (e.g., having on the order of hundreds of instructions in flight in the pipeline).

To avoid obscuring the description, a relatively simple processor 210 has been shown and described. In other embodiments, the processor may optionally include other well-known components, such as, for example, a prefetch buffer, an instruction queue, an instruction and/or data cache, an instruction and/or data translation lookaside buffer, a microinstruction queue, a rename/allocation unit, a microinstruction sequencer, execution units, a retirement/commit unit, a register renaming unit, bus interface unit, second and/or higher level instruction and/or data caches, other components included in processors, and various combinations thereof. There are literally numerous different combinations and configurations of components in processors, and embodiments are not limited to any particular combination or configuration.

FIG. 3 is a block flow diagram of an embodiment of a method 320 of processing conditional branches. In some embodiments, the operations and/or method of FIG. 3 may be performed by and/or within the processor of FIG. 2. The components, features, and specific optional details described herein for the processor of FIG. 2 also optionally apply to the operations and/or method of FIG. 3, which in embodiments may be performed by and/or within the processor of FIG. 2. Alternatively, the operations and/or method of FIG. 3 may be performed by and/or within a similar or entirely different processor or apparatus. Moreover, the processor of FIG. 2 may perform operations and/or methods the same as, similar to, or entirely different than those of FIG. 3.

The method includes fetching a conditional short forward branch, at block 321. In some embodiments, the conditional short forward branch may include a conditional branch instruction, and a set of one or more instructions that sequentially follow the conditional branch instruction in program order, and are between the conditional branch instruction and a forward branch target instruction indicated by the conditional branch instruction. In some embodiments, the conditional short forward branch may be similar to or the same as that of FIG. 1. Alternatively, the conditional short forward branch may be different than that shown in FIG. 1.

The method also includes converting the conditional short forward branch to a computationally equivalent set of one or more predicated instructions, at block 322. In some embodiments, this may include converting each of one or more instructions between the conditional branch instruction and the forward branch target instruction from non-predicated to corresponding predicated instructions. In some embodiments, this may include eliminating the conditional branch instruction.

In some embodiments, the method may further include providing signals corresponding to and/or representing the computationally equivalent set of the one or more predicated instructions to back end logic of a processor. In some embodiments, this may be done regardless of whether the conditional branch instruction would be predicted to be taken or not taken. In some embodiments, this may be done regardless of operation of branch prediction logic and/or whether the branch prediction makes a branch prediction for the conditional branch prediction and/or whether the instruction conversion logic knows of the branch prediction if one is made.

Figure 4:
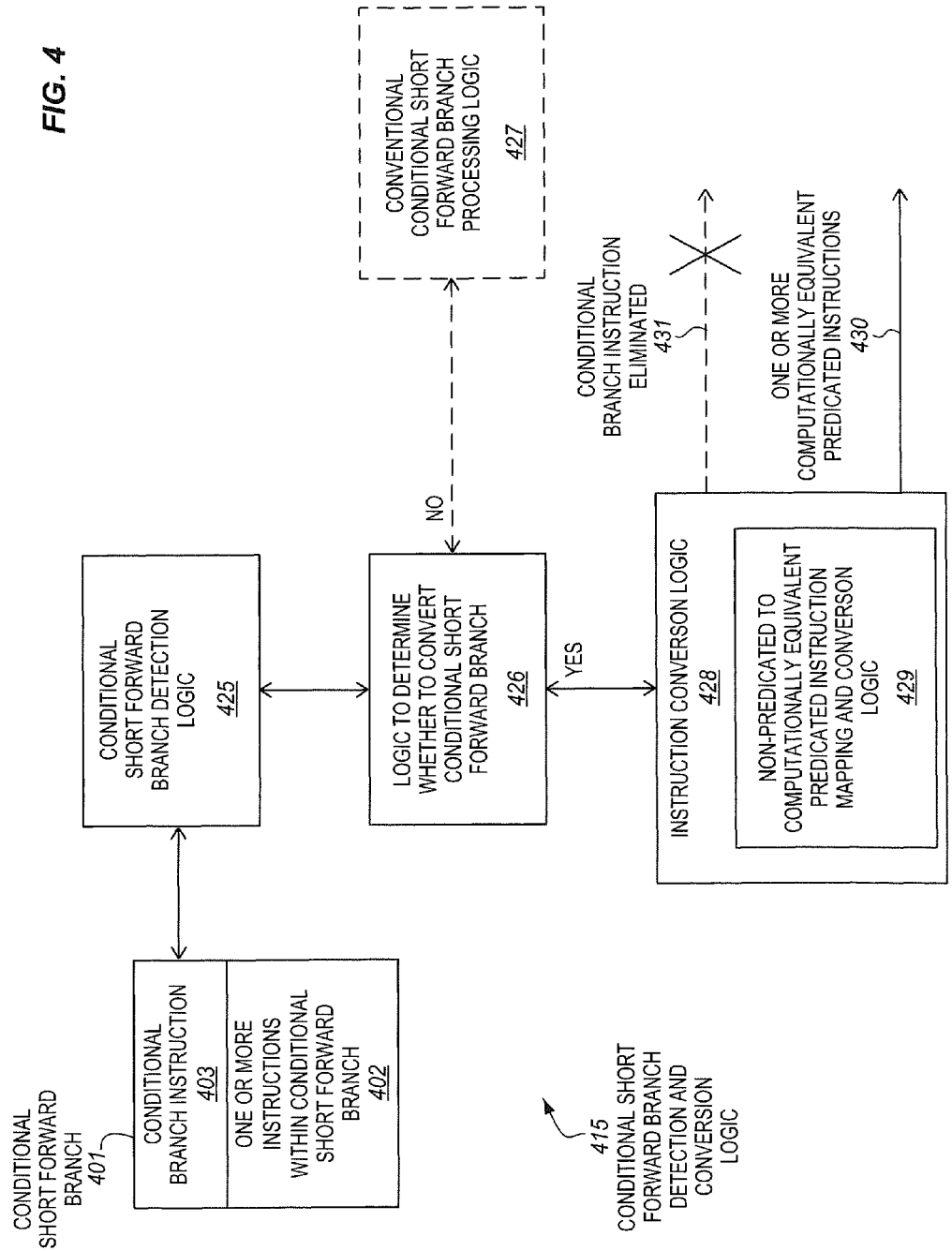
FIG. 4 is a block diagram illustrating conditional short forward branch detection and conversion logic.
Figure 5:
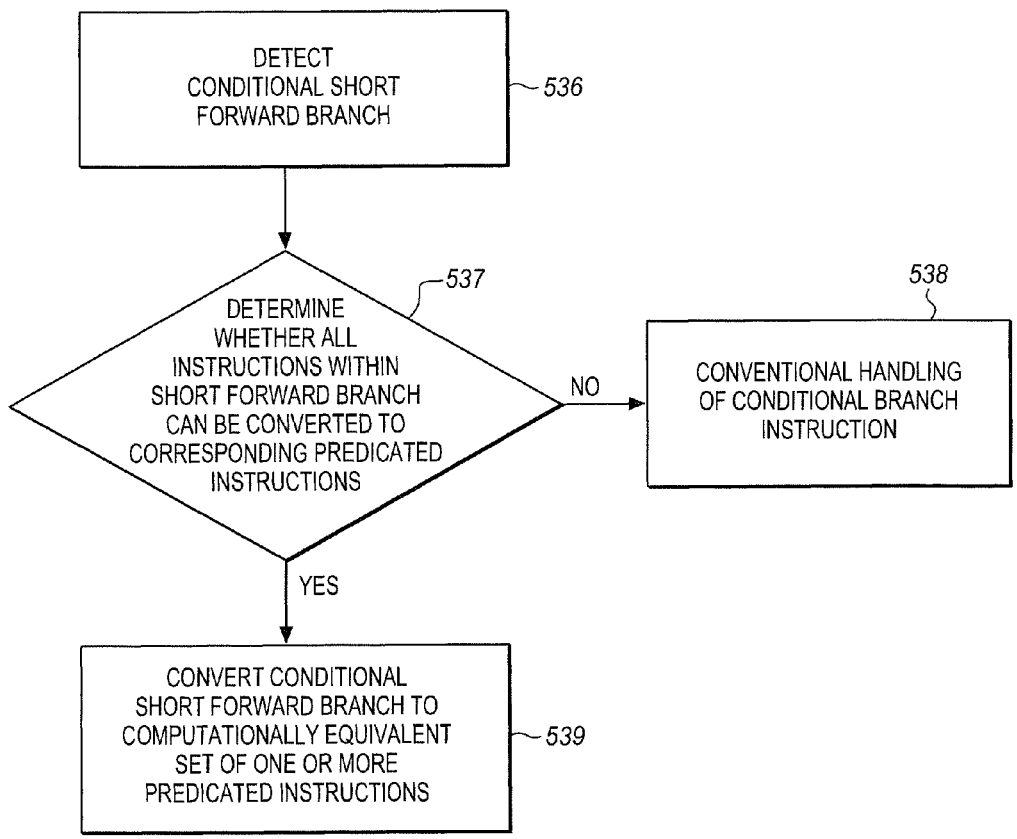
FIG. 5 is a block flow diagram of an embodiment of a method of detecting and determining whether or not to convert conditional short forward branches.

FIG. 4 is a block diagram illustrating conditional short forward branch detection and conversion logic 415. FIG. 5 is a block flow diagram of an embodiment of a method 535 of detecting and determining whether or not to convert conditional short forward branches. To streamline the description, the operations and method of FIG. 5 will be described with reference to the logic of FIG. 4. However, it should be understood that the operations and method of FIG. 5 may be performed by embodiments similar to or different than those of FIG. 4. Moreover, the logic of FIG. 4 may perform operations and methods the same as, similar to, or different than those of FIG. 5.

Referring to FIG. 4, conditional short forward branch detection logic 425 is operable to detect a conditional short forward branch 401. With reference to FIG. 5, the method includes detecting a conditional short forward branch, at block 536. In some embodiments, this may include detecting a conditional branch instruction and examining a forward branch target of the conditional branch instruction to determine whether or not the branch is forward and short (e.g., from about one to about ten instructions, or from about one to about five instructions).

Referring again to FIG. 4, logic 426 operable to determine whether to convert the conditional short forward branch is coupled with the conditional short forward branch detection logic 425. In some embodiments, the determination may be made based on whether or not corresponding computationally equivalent instructions are available for all of one or more instructions within the conditional short forward branch between the conditional branch instruction and a forward branch target of the conditional branch instruction. For example, it may be determined not to convert if a computationally equivalent predicated instruction does not exist for one or more of these instructions, or it may be determined to convert if computationally equivalent predicated instructions exist for all of these instructions. If the logic 426 determines not to convert the conditional short forward branch it may be provided to conventional conditional short forward branch processing logic 427. Alternatively, if the logic 426 determines to convert the conditional short forward branch then it may be provided to instruction conversion logic 428.

With reference to FIG. 5, the method includes determining whether all instructions within the short forward branch can be converted to corresponding functionally and/or computationally equivalent predicated instructions, at block 537. If not all the instructions within the short forward branch can be converted to corresponding functionally and/or computationally equivalent predicated instructions (i.e., "no" is the determination at block 537), then conventional handling of the conditional branch instruction may be performed, at block 538. Alternatively, if all the instructions within the short forward branch can be converted to corresponding functionally and/or computationally equivalent predicated instructions (i.e., "yes" is the determination at block 537), then the method may advance to block 539.

Referring again to FIG. 4, the instruction conversion logic 428 is coupled with the logic 426. The instruction conversion logic is operable to convert the instructions of the conditional short forward branch. The instruction conversion logic includes non-predicated to computationally equivalent predicated instruction mapping and conversion logic 429. The mapping and conversion logic is operable to map and convert each non-predicated instruction to a functionally equivalent predicated instruction. For example, an add instruction that specifies that an add operation is to be performed on a given pair of source operands to store a sum in a destination may be mapped and converted to a predicated add instruction that specifies (but conditionally) that an add operation is to be performed on the same given pair of source operands to store a sum in the same destination. In alternate embodiments, rather than one-to-one instruction to predicated instruction correspondences, one-to-multiple or multiple-to-one instruction to predicated instruction correspondences may also be used. One or more computationally and/or functionally equivalent predicated instructions 430 are output, for example, to further decode or other instruction conversion logic and/or toward a back end logic. Notice that the conditional branch instruction 403 is eliminated 431 during the conversion. With reference to FIG. 5, the method includes converting the conditional short forward branch to a functionally and/or computationally equivalent set of one or more predicated instructions, at block 539.

Figure 6:
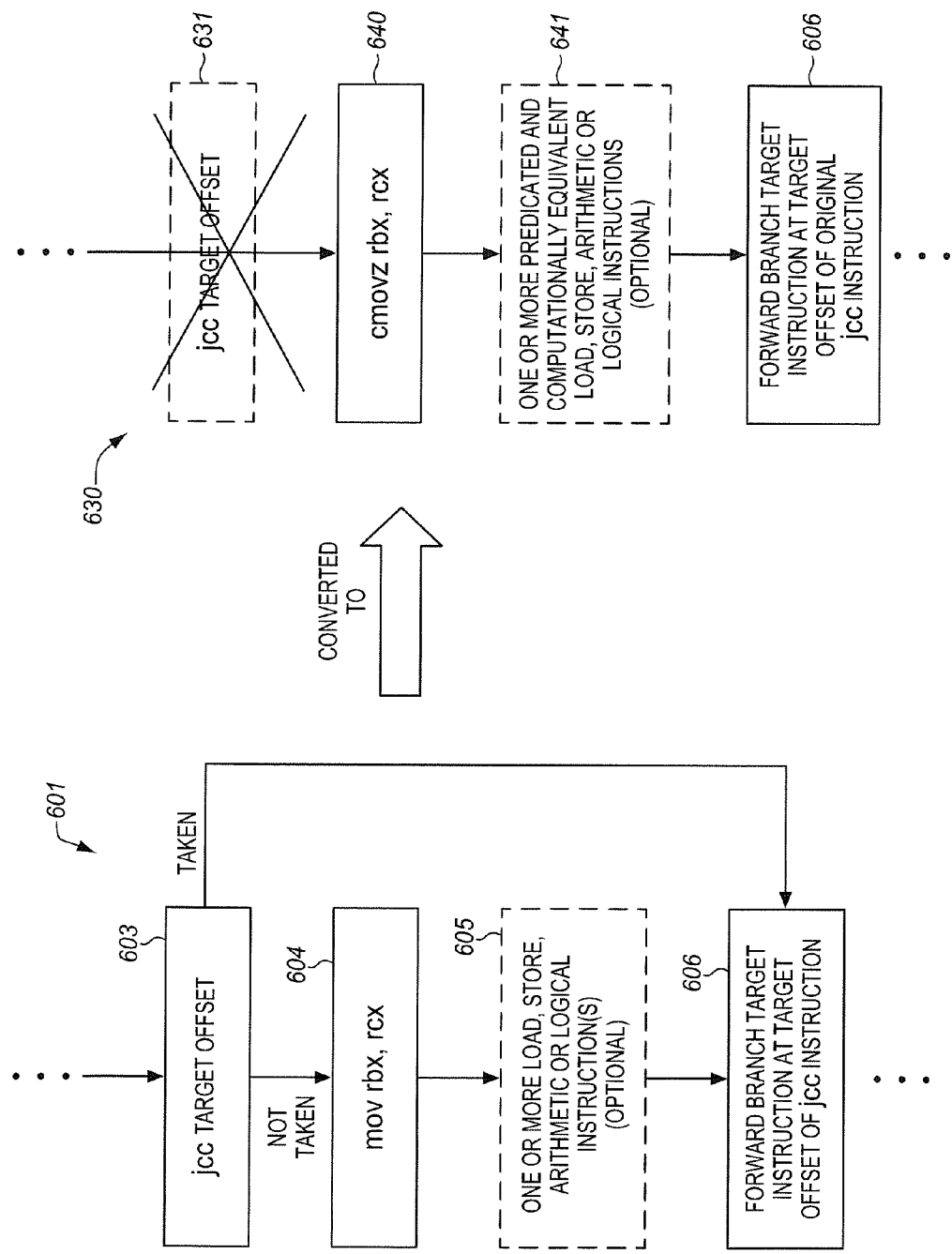
FIG. 6 illustrates conversion of an example embodiment of a conditional short forward branch to a computationally equivalent set of one or more predicated instructions.

FIG. 6 illustrates conversion of an example embodiment of a conditional short forward branch 601 to a computationally equivalent set of one or more predicated instructions 630. The conditional short forward branch 601 includes a jump if condition is met (jcc) instruction indicating a target offset 603. The jcc instruction has a "taken path" and a "not taken path." The taken path leads to a forward branch target instruction 606 located at the target offset of the jcc instruction. The not taken path leads to a mov instruction 604 that is to move general-purpose register rcx to general-purpose register rbx. This is just one example. After the mov instruction there may optionally be one or more load, store, arithmetic, or logical instructions, or a combination thereof 605.

The jcc instruction is eliminated 631 in the computationally equivalent set of the one or more predicated instructions 630. The taken and not taken paths are also effectively eliminated. There is no jumping over the instructions within the short forward branch regardless of the outcome of branch predication or even regardless of whether branch prediction is even performed. The computationally equivalent set of the one or more predicated instructions include a cmovz instruction, corresponding to the mov instruction 640, that is to conditionally or with predication move general-purpose register rcx to general-purpose register rbx. The cmovz instruction is an existing conditional instruction in Intel Architecture that raises exceptions regardless of the state of the condition. As another option, in some embodiments, the cmovz instruction may be replaced with a similar instruction that does not raise an exception when a condition of the conditional move instruction is false. In this way, when the conditional instruction is not supposed to have been executed, it may be completely ignored and have no effect including not raising any potential exceptions or the like. Also included are one or more predicated and computationally equivalent load, store, arithmetic, or logical instructions, or a combination thereof 641. These instructions are computationally equivalent to the instruction(s) 605. When it is determined that the set of predicated instructions are to be performed then they should give exactly the same result as the corresponding original non-predicated set of instructions. Notice that in some embodiments the forward branch target 606 does not need to be converted.

Figure 7:
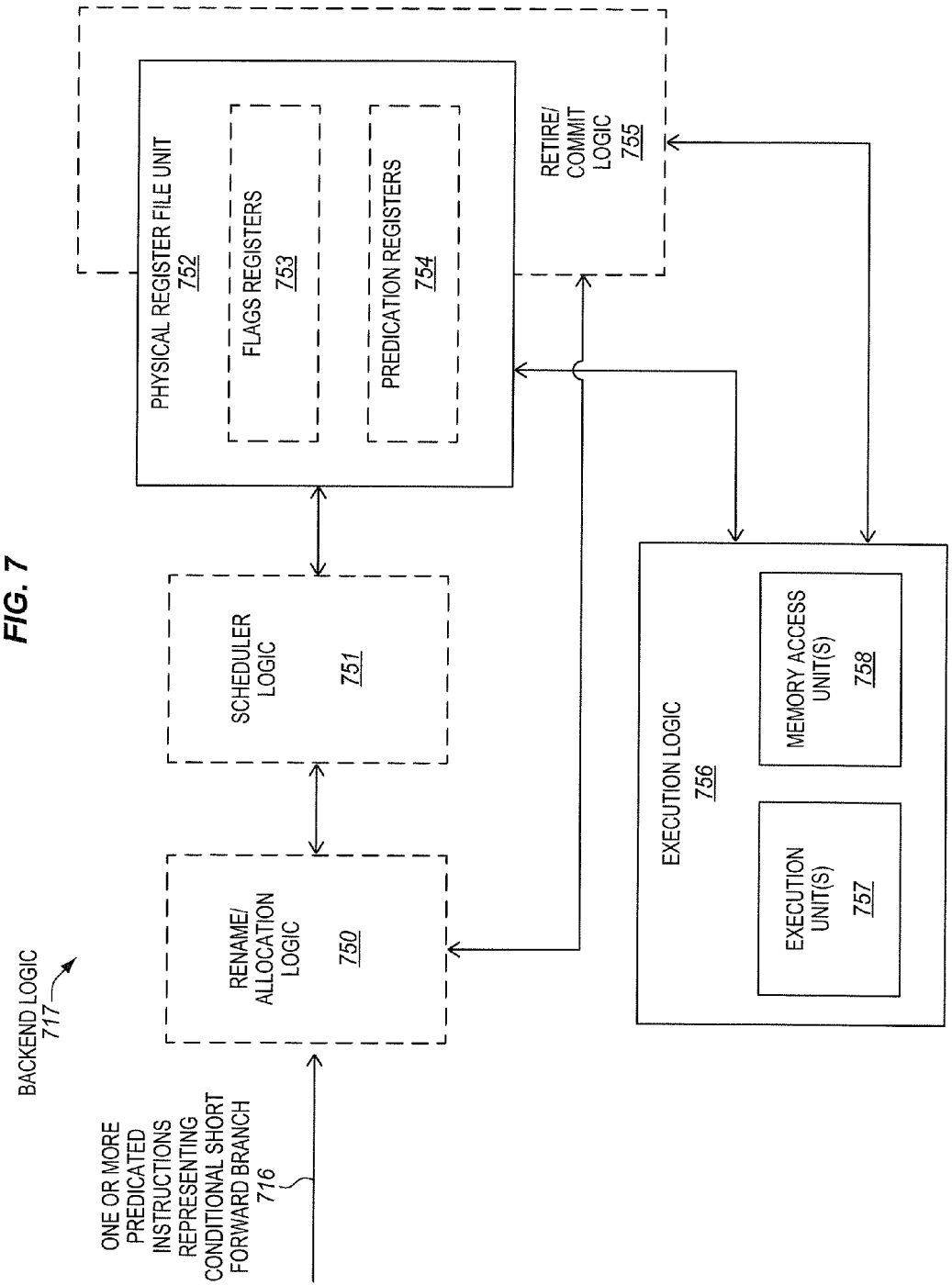
FIG. 7 is a block diagram of an embodiment of back end logic operable to update or not update architectural state to reflect a set of one or more predicated instructions that represent, and are computationally equivalent to, a conditional short forward branch.

FIG. 7 is a block diagram of an embodiment of back end logic 717 operable to update or not update architectural state to reflect a set of one or more predicated instructions 716 that represent, and are computationally equivalent to, a conditional short forward branch. In some embodiments, the back end logic may be used with the processor of FIG. 2. Alternatively, the back end logic may be used with a similar or different processor than that of FIG. 2. Moreover, the processor of FIG. 2 may use either the same, similar, or different back end logic.

Both an example embodiment of in-order logic and an example embodiment of register renaming, out-of-order scheduling/execution/retirement logic are shown. The solid lined boxes illustrate the in-order logic, while the optional addition of the dashed lined boxes illustrates the register renaming, out-of-order scheduling/execution/retirement logic. Given that the in-order aspect is a subset of the out-of-order aspect, the out-of-order aspect will be described, although the scope of the invention is not so limited.

The one or more predicated instructions 716 are provided to the back end logic 717. The one or more predicated instructions represent, and are computationally equivalent to, a conditional short forward branch, as described elsewhere herein. A rename/allocation logic 750 receives the set of predicated instructions. The rename/allocation logic is coupled to a retirement and/or commit logic 755 and a set of one or more scheduler logic(s) 751. The scheduler logic(s) represents any number of different schedulers, including reservations stations, central instruction window, etc. The scheduler logic(s) is coupled to a physical register file(s) unit(s) 752. Each of the physical register file(s) units represents one or more physical register files, different ones of which store one or more different data types, such as, for example scalar integer, scalar floating point, packed integer, packed floating point, vector integer, vector floating point, status (e.g., an instruction pointer that is the address of the next instruction to be executed), etc. In one embodiment, the physical register file(s) unit comprises a vector registers unit, a write mask registers unit, and a scalar registers unit. These register units may provide architectural vector registers, vector mask registers, and general purpose registers. In some embodiments, the physical register file(s) units may include a flags register(s) 753 and prediction register(s) 754, either or both of which may be used for predication by the predicated instructions.

The physical register file(s) unit(s) is overlapped by the retirement/commit logic 755 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement/commit logic and the physical register file(s) unit(s) are coupled to execution logic 756. The execution logic includes a set of one or more execution units 757 and a set of one or more memory access units 758. The execution logic may execute the predicated instructions disclosed herein. The execution unit(s) may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler logic, physical register file(s) unit(s), and execution logic are shown/described as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s)). It should also be understood that where separate pipelines are used, one or more of these pipelines may be out-of-order issue/execution and the rest in-order.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 performs the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
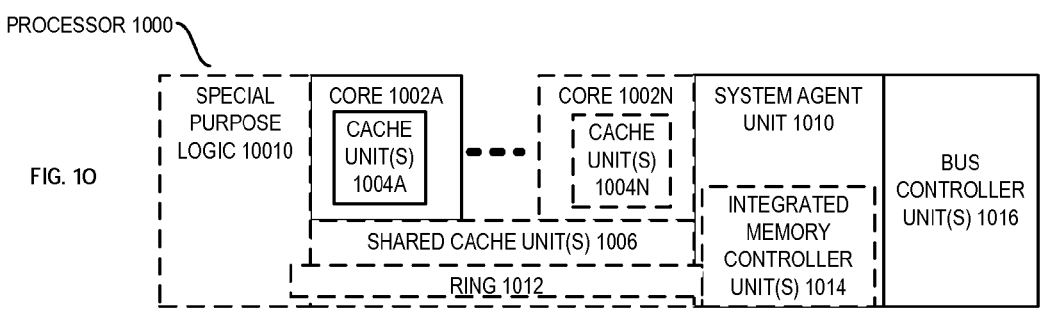
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multithreading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
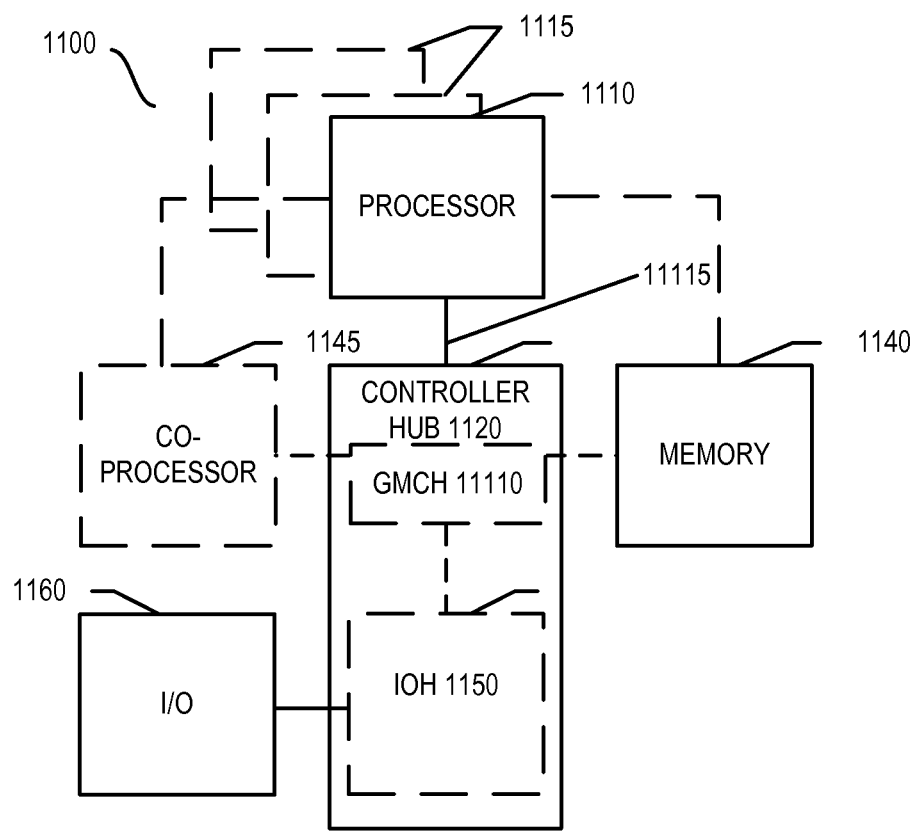
FIG. 11 shown is a block diagram of a system in accordance with one embodiment of the present invention.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
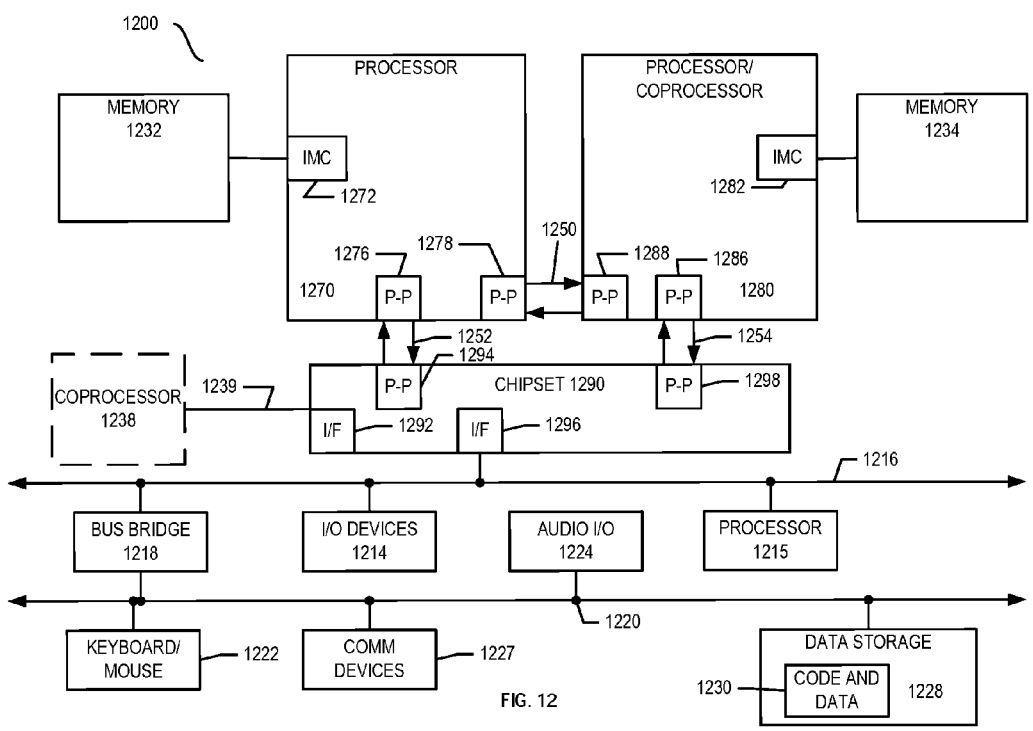
FIG. 12 shown is a block diagram of a first more specific exemplary system in accordance with an embodiment of the present invention.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
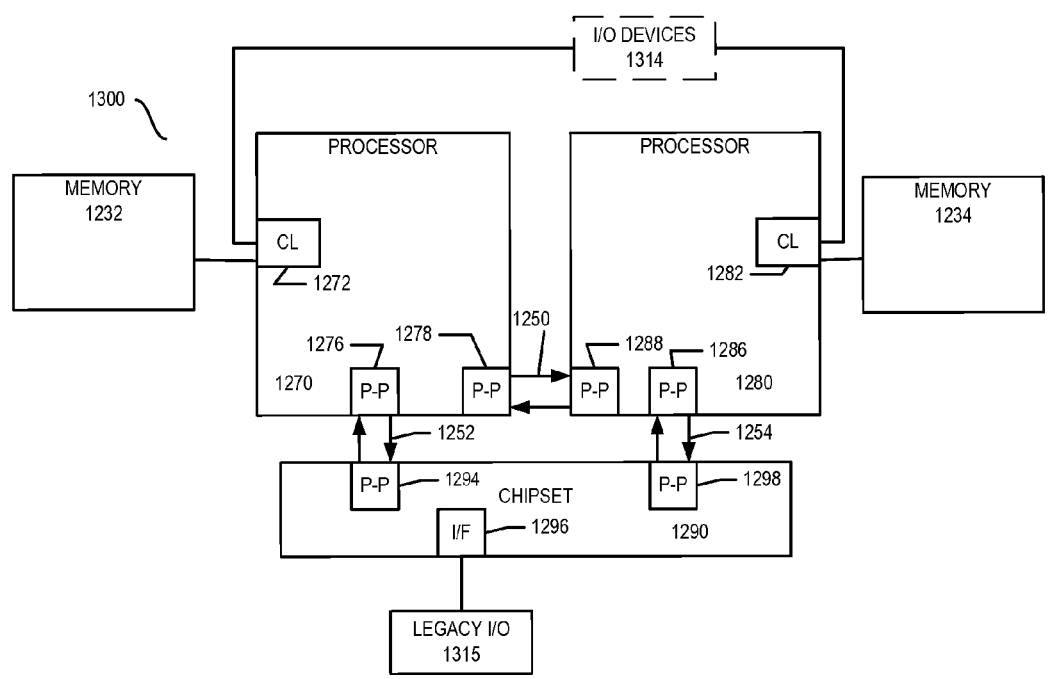
FIG. 13, shown is a block diagram of a second more specific exemplary system in accordance with an embodiment of the present invention.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
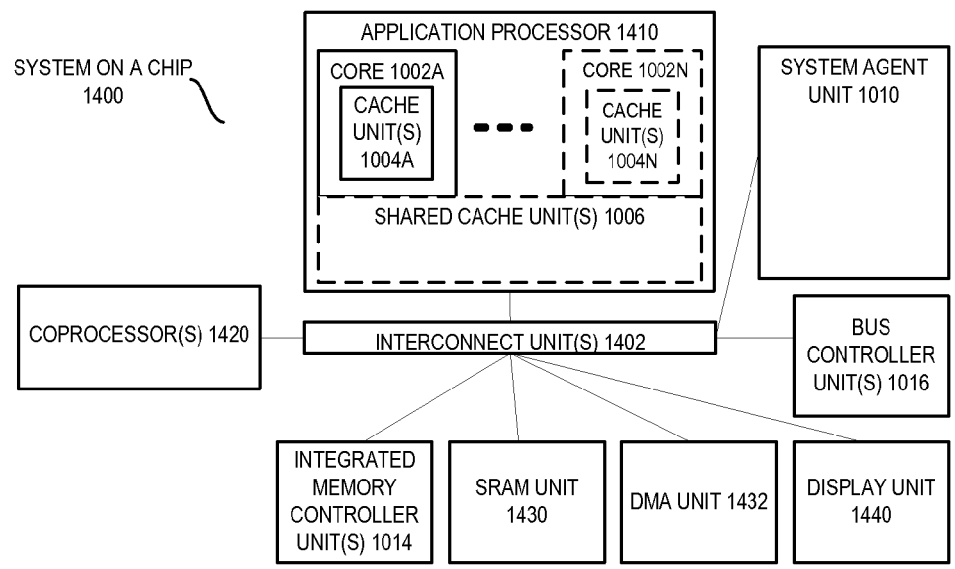
FIG. 14, shown is a block diagram of a SoC in accordance with an embodiment of the present invention.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
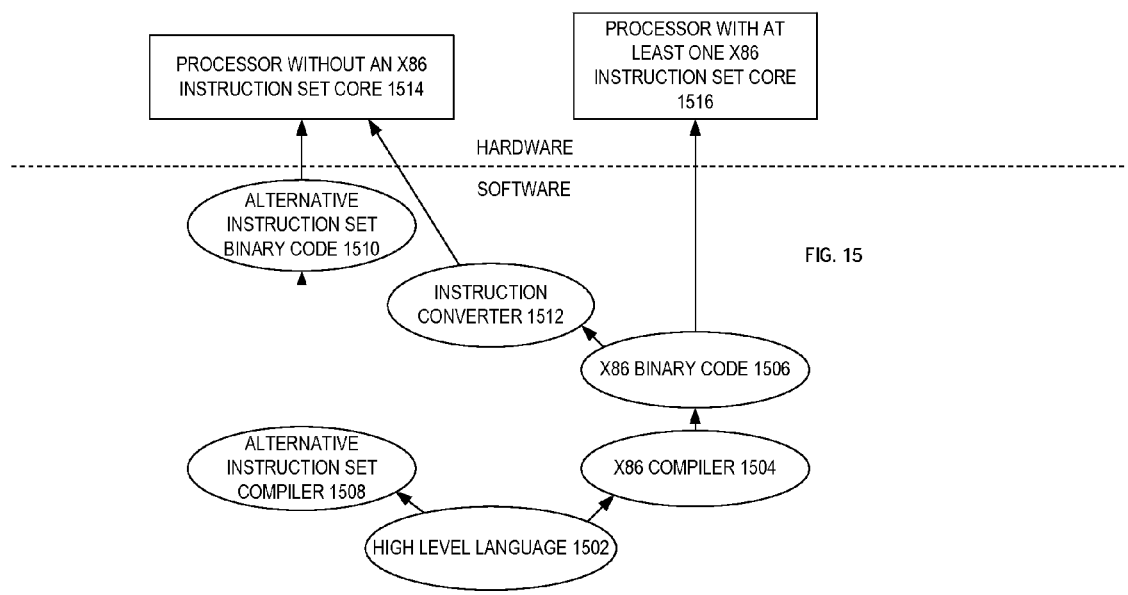
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

In some embodiments, the back end logic 717 may be operable to determine whether or not to update architectural state to reflect execution of the one or more predicated instructions 716. In some embodiments, the renaming/allocation logic 750, the scheduler logic(s) 751, the execution logic(s) 756, the retire/commit logic(s) 755, the physical register file unit(s) 752, or some combination thereof, may be operable to perform predication or conditional execution with respect to the predicated instructions. In some embodiments, this logic may be operable to determine not to update the architectural state to reflect the execution of the computationally equivalent set of the one or more predicated instructions upon determining ultimately or definitively that the conditional branch instruction should have been taken. Alternatively, this logic may be operable to determine to update the architectural state to reflect the execution of the computationally equivalent set of the one or more predicated instructions upon determining ultimately or definitively that the conditional branch instruction should not have been taken. Note that the conditional branch instruction doesn't necessarily need to be evaluated but it just needs to know the outcome of the condition associated with the conditional branch instruction. By way of example, each conditional instruction may specify one or more predicate bits (e.g., one or more bits in the predicate register(s) 754), one or more flag bits (e.g., one or more bits in the flag register(s) 753), or the like. If the value of the bit or bits specified by the predicated instructions have one value (e.g., a bit is set or true), then the instruction may be executed and its result committed to architectural state. Otherwise if the value of the bit or bits have another different value (e.g., the bit is clear or false), then the instruction may not be executed or its result or effect may not be committed to architectural state.

Components, features, and details described for any of FIG. 1, 4, 5, 6, or 7 may also optionally be used in any of FIG. 2 or 3. Moreover, components, features, and details described herein for any of the apparatus may also optionally be used in any of the methods described herein, which in embodiments may be performed by and/or with such the apparatus.

Example Embodiments

The following examples pertain to further embodiments. Specifics in the examples may be used anywhere in one or more embodiments.

Example 1 is a processor to process conditional branches. The process includes an instruction fetch logic to fetch a conditional short forward branch, the conditional short forward branch to include a conditional branch instruction and a set of one or more instructions that are to sequentially follow the conditional branch instruction in program order between the conditional branch instruction and a forward branch target instruction that is to be indicated by the conditional branch instruction. The process also includes instruction conversion logic coupled with the instruction fetch logic, the instruction conversion logic to convert the conditional short forward branch to a computationally equivalent set of one or more predicated instructions.

Example 2 includes the subject matter Example 1 and optionally wherein the instruction conversion logic is to eliminate the conditional branch instruction.

Example 3 includes the subject matter of Example 1 and optionally wherein the instruction conversion logic is to convert each of the set of the one or more instructions that are to be between the conditional branch instruction and the forward branch target instruction from non-predicated to predicated instructions.

Example 4 includes the subject matter of Example 1 and optionally wherein the instruction conversion logic is to convert each of a plurality of instructions that are to be between the conditional branch instruction and the forward branch target instruction from non-predicated to predicated instructions.

Example 5 includes the subject matter of Example 1 and optionally wherein the instruction conversion logic is to output signals representing the computationally equivalent set of the one or more predicated instructions regardless of whether the conditional branch instruction is predicted to be taken or not taken.

Example 6 includes the subject matter of Example 1 and optionally wherein the instruction conversion logic comprises hardware logic at a decode stage of a pipeline of the processor.

Example 7 includes the subject matter of Example 1 and optionally wherein the set of the one or more instructions between the conditional branch instruction and the forward branch target instruction consists of a single move instruction, and wherein the instruction conversion logic is to convert the move instruction to a conditional move instruction.

Example 8 includes the subject matter of Example 7 and optionally wherein the conditional move instruction does not raise an exception when a condition of the conditional move instruction is false.

Example 9 includes the subject matter of any of Examples 1-7 and optionally wherein the instruction conversion logic is to output signals representing the computationally equivalent set of the one or more predicated instructions without the instruction conversion logic needing to know a branch prediction for the conditional branch instruction.

Example 10 includes the subject matter of any of Examples 1-7 and optionally further comprising back end logic coupled with the instruction conversion logic, the back end logic to execute the computationally equivalent set of the one or more predicated instructions and to determine not to update architectural state to reflect the execution of the computationally equivalent set of the one or more predicated instructions upon determining that the conditional branch instruction should have been taken.

Example 11 includes the subject matter of any of Examples 1-7 and optionally further comprising back end logic coupled with the instruction conversion logic, the back end logic to execute the computationally equivalent set of the one or more predicated instructions and to determine to update architectural state to reflect the execution of the computationally equivalent set of the one or more predicated instructions upon determining that the conditional branch instruction should not have been taken.

Example 12 includes the subject matter of any of Examples 1-7 and optionally wherein the instruction fetch logic is to always fetch the one or more instructions that are between the conditional branch instruction and the forward branch target instruction irrespective of the prediction of the conditional branch instruction.

Example 13 is a method of processing conditional branches. The method includes fetching a conditional short forward branch, the conditional short forward branch including a conditional branch instruction and a set of one or more instructions sequentially following the conditional branch instruction in program order between the conditional branch instruction and a forward branch target instruction indicated by the conditional branch instruction. The method also includes converting the conditional short forward branch to a computationally equivalent set of one or more predicated instructions.

Example 14 includes the subject matter of Example 13 and optionally further comprising providing signals representing the computationally equivalent set of the one or more predicated instructions to back end logic of a processor regardless of whether the conditional branch instruction would be predicted to be taken or not taken.

Example 15 includes the subject matter of Example 13 and optionally wherein converting comprises converting each of the set of the one or more instructions between the conditional branch instruction and the forward branch target instruction from non-predicated to predicated instructions.

Example 16 includes the subject matter of Example 13 and optionally wherein converting comprises converting each of a plurality of instructions between the conditional branch instruction and the forward branch target instruction from non-predicated to predicated instructions.

Example 17 includes the subject matter of Example 13 and optionally wherein converting comprises eliminating the conditional branch instruction, wherein converting comprises converting at a decode stage of a pipeline of a processor.

Example 18 includes the subject matter of any of Examples 13-17 and optionally further comprising providing signals representing the computationally equivalent set of the one or more predicated instructions to back end logic of a processor regardless of operation of branch prediction logic.

Example 19 includes the subject matter of any of Examples 13-17. The subject matter includes executing the computationally equivalent set of the one or more predicated instructions. The subject matter also includes determining in fact that the conditional branch instruction should be taken and determining not to update architectural state to reflect the execution of the computationally equivalent set of the one or more predicated instructions in response to determining that the conditional branch instruction should be taken.

Example 20 includes the subject matter of any of Examples 13-17. The subject matter includes executing the computationally equivalent set of the one or more predicated instructions. The subject matter also includes determining in fact that the conditional branch instruction should not be taken. The subject matter also includes determining to update architectural state to reflect the execution of the computationally equivalent set of the one or more predicated instructions in response to determining that the conditional branch instruction should not be taken.

Example 21 includes the subject matter of any of Examples 13-17 and optionally wherein fetching comprises fetching the one or more instructions between the conditional branch instruction and the forward branch target instruction even when the conditional branch instruction is predicted to be taken.

Example 22 is a method of processing conditional branches. The method includes detecting a conditional branch instruction. The method also includes determining that a short forward branch follows the conditional branch instruction. The method also includes determining that all instructions within the short forward branch can be converted to corresponding computationally equivalent predicated instructions.

Example 23 includes the subject matter of Examples 22 and optionally further converting said all of the instructions within the short forward branch to the corresponding computationally equivalent predicated instructions and eliminating the conditional branch instruction.

Example 24 includes the subject matter of any of Examples 22-23. The subject matter includes the executing the computationally equivalent predicated instructions. The subject matter includes determining definitively that the conditional branch instruction should be taken. The subject matter includes determining not to update architectural state to reflect the execution of the computationally equivalent predicated instructions after determining that the conditional branch instruction should be taken.

Example 25 is a system to process conditional branches. The system includes an interconnect. The system also includes a processor coupled with the interconnect, the processor including an instruction fetch logic to fetch a conditional short forward branch, the conditional short forward branch to include a conditional branch instruction and a set of one or more instructions that are to sequentially follow the conditional branch instruction in program order between the conditional branch instruction and a forward branch target instruction that is to be indicated by the conditional branch instruction. The system also includes instruction conversion logic coupled with the instruction fetch logic, the instruction conversion logic to convert the conditional short forward branch to a computationally equivalent set of one or more predicated instructions. The system also includes a dynamic random access memory (DRAM) coupled with the interconnect.

Example 26 includes the subject matter Example 25 and optionally wherein the instruction conversion logic is to eliminate the conditional branch instruction, and wherein the instruction conversion logic is to convert each of the set of the one or more instructions that are to be between the conditional branch instruction and the forward branch target instruction from non-predicated to predicated instructions.

Example 27 includes the subject matter of any of Examples 25-26 including back end logic coupled with the instruction conversion logic, the back end logic to execute the computationally equivalent set of the one or more predicated instructions and to determine not to update architectural state to reflect the execution of the computationally equivalent set of the one or more predicated instructions upon determining that the conditional branch instruction should have been taken.

Example 28 includes an apparatus to perform the method of any of Examples 13-17.

Example 29 includes an apparatus comprising means for performing the method of any of Examples 13-17.

Example 30 includes an apparatus to perform the method of any of Examples 22-23.

Example 31 includes an apparatus comprising means for performing the method of any of Examples 22-23.

Example 32 includes a processor to perform a method substantially as described herein.

Example 33 includes a processor comprising means for performing a method substantially as described herein.

In the description and claims, the terms "coupled" and "connected," along with their derivatives, may have been used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, instruction conversion logic may be coupled with instruction fetch logic by an intervening instruction queue or other instruction storage. In the figures, arrows are used to show connections and couplings.

In the description and claims, the term "logic" may have been used. As used herein, logic may include hardware, firmware, software, or a combination thereof. Examples of logic include integrated circuitry, application specific integrated circuits, analog circuits, digital circuits, programmed logic devices, memory devices including instructions, etc. In some embodiments, the hardware logic may include transistors and/or gates potentially along with other circuitry components.

The term "and/or" may have been used. As used herein, the term "and/or" means one or the other or both (e.g., A and/or B means A or B or both A and B).

In the description above, for purposes of explanation, numerous specific details have been set forth in order to provide a thorough understanding of embodiments of the invention. It will be apparent however, to one skilled in the art, that one or more other embodiments may be practiced without some of these specific details. The particular embodiments described are not provided to limit the invention but to illustrate it through example embodiments. The scope of the invention is not to be determined by the specific examples but only by the claims. In other instances, well-known circuits, structures, devices, and operations have been shown in block diagram form or without detail in order to avoid obscuring the understanding of the description.

Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been described, they may be incorporated into a single component. In other cases, where a single component has been described, it may be partitioned into multiple components.

Various operations and methods have been described. Some of the methods have been described in a relatively basic form in the flow diagrams, but operations may optionally be added to and/or removed from the methods. In addition, while the flow diagrams show a particular order of the operations according to example embodiments, that particular order is exemplary. Alternate embodiments may optionally perform the operations in different order, combine certain operations, overlap certain operations, etc.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A processor to process conditional branches comprising:
    an instruction fetch logic to fetch a conditional short forward branch, the conditional short forward branch to include a conditional branch instruction and a set of one or more instructions that are to sequentially follow the conditional branch instruction in program order between the conditional branch instruction and a forward branch target instruction that is to be indicated by the conditional branch instruction;
    logic to determine to convert the conditional short forward branch based at least in part on a determination that a computationally equivalent set of one or more predicated instructions is available in an instruction set of the processor that also includes the conditional branch instruction; and
    instruction conversion logic coupled with the instruction fetch logic, the instruction conversion logic to convert the conditional short forward branch to control signals that correspond to the computationally equivalent set of the one or more predicated instructions that are each available in the instruction set of the processor that also includes the conditional branch instruction.

2. The processor of claim 1, wherein the instruction conversion logic is to eliminate the conditional branch instruction.

3. The processor of claim 1, wherein the instruction conversion logic is to convert each of the set of the one or more instructions that are to be between the conditional branch instruction and the forward branch target instruction from a non-predicated instruction to control signals that correspond to a predicated instruction.

4. The processor of claim 1, wherein the instruction conversion logic is to convert each of a plurality of instructions that are to be between the conditional branch instruction and the forward branch target instruction from a non-predicated instruction to control signals that correspond to a predicated instruction.

5. The processor of claim 1, wherein the instruction conversion logic is to output the control signals representing the computationally equivalent set of the one or more predicated instructions regardless of whether the conditional branch instruction is predicted to be taken or not taken.

6. The processor of claim 1, wherein the instruction conversion logic comprises hardware logic at a decode stage of a pipeline of the processor.

7. The processor of claim 1, wherein the set of the one or more instructions between the conditional branch instruction and the forward branch target instruction consists of a single move instruction, and wherein the instruction conversion logic is to convert the move instruction to control signals that correspond to a conditional move instruction.

8. The processor of claim 7, wherein the conditional move instruction does not raise an exception when a condition of the conditional move instruction is false.

9. The processor of claim 1, wherein the instruction conversion logic is to output control signals representing the computationally equivalent set of the one or more predicated instructions without the instruction conversion logic needing to know a branch prediction for the conditional branch instruction.

10. The processor of claim 1, further comprising back end logic coupled with the instruction conversion logic, the back end logic to execute the computationally equivalent set of the one or more predicated instructions and to determine not to update architectural state to reflect the execution of the computationally equivalent set of the one or more predicated instructions upon determining that the conditional branch instruction should have been taken.

11. The processor of claim 1, further comprising back end logic coupled with the instruction conversion logic, the back end logic to execute the computationally equivalent set of the one or more predicated instructions and to determine to update architectural state to reflect the execution of the computationally equivalent set of the one or more predicated instructions upon determining that the conditional branch instruction should not have been taken.

12. The processor of claim 1, wherein the instruction fetch logic is to always fetch the one or more instructions that are between the conditional branch instruction and the forward branch target instruction irrespective of a prediction of the conditional branch instruction.

13. A method of processing conditional branches comprising:
fetching a conditional short forward branch, the conditional short forward branch including a conditional branch instruction and a set of one or more instructions sequentially following the conditional branch instruction in program order between the conditional branch instruction and a forward branch target instruction indicated by the conditional branch instruction;
determining whether an instruction set of a processor that includes the conditional branch instruction also includes a computationally equivalent set of one or more predicated instructions; and
converting the conditional short forward branch to control signals corresponding to the computationally equivalent set of the one or more predicated instructions that are each included in the instruction set of the processor that also includes the conditional branch instruction.

14. The method of claim 13, further comprising providing the control signals representing the computationally equivalent set of the one or more predicated instructions to back end logic of a processor regardless of whether the conditional branch instruction would be predicted to be taken or not taken.

15. The method of claim 13, wherein converting comprises converting each of the set of the one or more instructions between the conditional branch instruction and the forward branch target instruction from a non-predicated instruction to control signals corresponding to a predicated instruction.

16. The method of claim 13, wherein converting comprises converting each of a plurality of instructions between the conditional branch instruction and the forward branch target instruction from a non-predicated instruction to control signals corresponding to a predicated instruction.

17. The method of claim 13, wherein converting comprises eliminating the conditional branch instruction, wherein converting comprises converting at a decode stage of a pipeline of a processor.

18. The method of claim 13, further comprising providing the control signals representing the computationally equivalent set of the one or more predicated instructions to back end logic of a processor regardless of operation of branch prediction logic.

19. The method of claim 13, further comprising:
executing the computationally equivalent set of the one or more predicated instructions;
determining in fact that the conditional branch instruction should be taken; and
determining not to update architectural state to reflect the execution of the computationally equivalent set of the one or more predicated instructions in response to determining that the conditional branch instruction should be taken.

20. A method of processing conditional branches comprising:
detecting a conditional branch instruction;
determining that a short forward branch follows the conditional branch instruction; and
determining that all instructions within the short forward branch can be converted to corresponding computationally equivalent predicated instructions of a same instruction set as the conditional branch instruction.

21. The method of claim 20, further comprising converting said all of the instructions within the short forward branch to control signals corresponding to the corresponding computationally equivalent predicated instructions and eliminating the conditional branch instruction.

22. The method of claim 20, further comprising:
executing the computationally equivalent predicated instructions;
determining definitively that the conditional branch instruction should be taken; and
determining not to update architectural state to reflect the execution of the computationally equivalent predicated instructions after determining that the conditional branch instruction should be taken.

23. A system to process conditional branches comprising:
an interconnect;
a processor coupled with the interconnect, the processor comprising:
an instruction fetch logic to fetch a conditional short forward branch, the conditional short forward branch to include a conditional branch instruction and a set of one or more instructions that are to sequentially follow the conditional branch instruction in program order between the conditional branch instruction and a forward branch target instruction that is to be indicated by the conditional branch instruction;
logic to determine whether a computationally equivalent set of one or more predicated instructions is available in an instruction set of the processor that also includes the conditional branch instruction; and
instruction conversion logic coupled with the instruction fetch logic, the instruction conversion logic to convert the conditional short forward branch to control signals that correspond to the computationally equivalent set of the one or more predicated instructions that are each available in the instruction set of the processor that also includes the conditional branch instruction; and
a dynamic random access memory (DRAM) coupled with the interconnect.

24. The system of claim 23, wherein the instruction conversion logic is to eliminate the conditional branch instruction, and wherein the instruction conversion logic is to convert each of the set of the one or more instructions that are to be between the conditional branch instruction and the forward branch target instruction from a non-predicated instruction to control signals that correspond to a predicated instruction.

* * * * *